United States Patent Office 2,697,066
Patented Dec. 14, 1954

2,697,066
METHOD OF PRODUCING GEL-TYPE INORGANIC OXIDE CATALYSTS
Robert P. Sieg, Berkeley, Calif., assignor to California Research Corporation, San Francisco, Calif., a corporation of Delaware No Drawing. Application December 28, 1950,
Serial No. 203,199
19 Claims. (Cl. 196—50)

This invention relates to improvements in the preparation of gel-type inorganic oxide catalysts for catalytic conversion processes employing elevated temperatures and, particularly, to a method of preparing solid oxide catalysts which are characterized by a high surface area, high degree of porosity, and unusual mechanical stability.

It has been previously proposed to increase the catalytic activity of solid gel-type catalysts by means of incorporating organic compounds and carbon per se into the catalyst mass during its preparation, and burning out the combustible carbon additive during calcining to effect a higher degree of porosity. While a certain amount of improvement in catalytic activity was gained in such a manner, the improvements did not offset the resulting loss in mechanical strength and abrasion resistance. Furthermore, the increased porosity rendered the catalyst mass extremely difficult to pelletize or form beads. Accordingly, any increase in conversion of charge attained by the increased porosity of the catalyst mass could not practically be realized by reason of its attendant disadvantages.

It has now been found possible to prepare gel-type oxide catalysts wherein the porosity may be controlled to effect an increase in available catalytic surface area and produce a catalyst mass which additionlly possesses greater mechanical stability and strength and is more resistant to abrasion and attrition. Besides the unusual mechanical stability and desirable pelletizing properties, the catalysts prepared in accordance with the invention possess a greater catalytic selectivity in that they promote higher yields of liquid conversion products and a pronounced reduction in secondary reactions which lead to tar, coke and gas formation. This increase in catalytic selectivity for the primary reaction is attributed to improved diffusional transfer of reactants and products, as well as an inherent difference in the porous and catalytic nature of the gel catalysts produced according to this invention.

These unusual achievements in catalyst preparation are generally applicable to those catalyst compositions which are formulated with a synthetic gel-type inorganic oxide as an active catalyst or catalyst support material. Included within the classification are the active oxides of silicon, aluminum, chromium, molybdenum, magnesium, iron, vanadium, manganese, copper, nickel, titanium, thorium, zirconium, and tungsten, as well as others which are recognized as possessing catalytic activity in the conduct of organic conversion processes. These catalyst bases may be used individually or in combination with one another as plural oxide catalysts or catalyst bases and may be coprecipitated with or impregnated on a precipitated active oxide base. One requirement of the present preparation process is that at least one of the active gel-type oxide components of the catalyst composition or base be formed by precipitation from a soluble salt or oxide-convertible compound of its element.

It has been discovered that when a gel-type inorganic oxide is precipitated from a solution containing a controlled amount of dissolved or dispersed high molecular weight combustible organic material, a catalyst composition may be produced which not only possesses exceptional catalytic properties, but also includes unusual mechanical stability and pelletizing characteristics. It has been ascertained that the molecular weight and amount of the organic material used in the precipitation of the hydrous oxide is a controlling factor in the regulation of the available active surface, degree and type of porosity, mechanical strength characteristics and resultant activity and selectivity of the finished catalyst. The desired physical characteristics of the catalyst are dependent upon the catalyst composition and the particular type of catalytic conversion process in which it is to be employed.

Broadly, the improvements in catalyst activity obtained by the subject preparation process are applicable to the production of solid catalysts for such conversion processes as dehydrogenation, hydrogenation, cracking, reforming, desulfurization, dehydration, isomerization, cyclization, etc., as well as special modifications thereof, wherein the conversion of an organic charge is effected or at least promoted by contact in the vapor or liquid phase with a solid oxide catalyst at elevated temperatures. The preparation of these catalysts proceeds in substantially the conventional manner except for the initial precipitation of the hydrous gel. The organic material which is occluded within the gel structure may be partially decomposed during the initial drying stage when the gel structure is established, and is wholly removed by oxidation in the calcining of the catalytic oxide.

In order to effect the modification and improvement in catalyst structure and associated activity, the precipitation is conducted in the presence of a water-dispersible, high molecular weight, organic material which is present in amounts ranging from about 3 to 30% by weight, based upon the anhydrous oxide content of the catalyst. The particular optimum amount of organic material used is dependent upon the molecular weight of the organic material, the composition of the catalyst, and the type of improvement desired, e. g., increased surface area, increased diffusional transfer, increased selectivity, etc., provided that within this range the amount of organic material is insufficient in and of itself to set up into a gel structure during the precipitation of the inorganic hydrogel. It is of particular importance to maintain the organic material uniformly distributed as the internal phase during the precipitation of the oxide gel and avoid organic gel formation when employing gel-forming organic materials. The molecular weight of the organic materials is dependent upon the type of conversion process to which the catalyst composition is applied and especially the molecular weight of the organic charge to the conversion process. As a general proposition, it has been found that organic materials having a molecular weight within the range of about $1 \times 10^3$ to $1 \times 10^7$ have proven effective in the preparation of catalyst compositions for conversion processes charging stocks ranging from $C_4$ to about $C_{20}$ or from a butane fraction to heavy gas oil. These organic materials may consist of substantially uniform compounds or polymers or, as is generally the case in materials of this molecular weight range, of a mixture of compounds or naturally occurring compositions whose molecular weights extend over a substantial range. In the latter instance, reference is made to the mean or apparent molecular weight of the mixed organic materials of varying molecular or particle weights.

The types of high molecular weight organic materials found suitable for the purposes of the invention, and particularly within the preferred molecular weight range of about $1 \times 10^4$ to $1 \times 10^6$, include such materials as the various animal and vegetable proteins, cellulosic materials and derivatives thereof, high molecular weight carbohydrates, alcohols, and esters, as well as certain natural and synthetic aqueous emulsions or colloids, such as the rubber latices, microscopic living organisms, bacteria, molds, etc.

The choice of the materials within the prescribed molecular weight range will depend upon their solubility or dispersibility in the precipitation solution and a reasonable stability during the drying step when the inorganic gel structure is established. Although a partial decomposition of the organic material during the drying step may be tolerated, substantial decomposition will negate the effect of the organic additive for the purposes of the invention. The initial drying step must necessarily be conducted at elevated temperatures of at least about 150° F. in order to appreciate the improvement in catalyst structure attained by the invention process. During this initial drying stage, the crystalline or lattice structure of the inorganic oxide base is established, and any interference through the formation of an organic gel structure is definitely to be avoided. As a precaution in this regard, the amounts of organic additive employed in the precipitation step should be insufficient to form an organic gel in the case of those organic materials which possess gel-forming characteristics; and, as an added safeguard, the structure-forming step or the initial drying step is conducted at superatmospheric temperatures of at least 150° F. in order to destroy any incidental organic gel structures set up by the organic additive. When effecting the drying step at lower temperatures, such as atmospheric temperature, and employing sufficient amounts of a gel-forming organic additive, the resulting organic gel prevents the formation of an adequate mechanical structure within the inorganic oxide gel and results in a low-density oxide base of inadequate stability.

As previously stated, the organic material is applied to the precipitation step in the form of an aqueous dispersion in order to obtain uniform phase distribution within the inorganic gel structure. This aqueous dispersion may be either physical or molecular, as in the case of colloids, suspensions, and solutions. In conducting the precipitation of the inorganic hydrogel, the pH of the precipitating solution is controlled to not only effect the precipitation, but also to avoid coagulation of the organic additive. This optimum pH is variable and depends upon the type of hydrogel precipitated and in some cases the isoelectric point of the organic additive.

It has been ascertained that organic materials possessing a molecular weight below $1 \times 10^3$, such as the simple sugars and the like, do not effect any material improvement in the available catalytic surfaces of the inorganic gel catalysts. On the other hand, organic materials having an apparent weight greater than $1 \times 10^7$, and particularly such materials which have been ground to fine powders, increase the gel porosity, decrease the physical strength and have no measurable effect on total gel surface area or useful catalytic surface as evidenced by activity. As an illustration of the magnitude of the molecular or apparent weights of fine powders, 200-mesh organic particles have an apparent particle weight of approximately $1 \times 10^{17}$; and 10 weight per cent of such powdered additive, if completely effective, would increase the gel surface area only a few hundredths of a square meter per gram. On the other hand, 10 weight per cent of the organic additive materials within the molecular weight ranges herein specified have been found to cause substantial increases in the resultant measurable surface area of the oxide gels, for example, 10 to 100 square meters per gram, and such increases are of even greater proportional value in catalytic effectiveness because of the availability of the active surface resulting from such molecular-sized additives.

Experimental evidence indicates that the molecular weight of the organic additive for optimum effectiveness of catalyst structures in organic conversion processes is substantially proportionate to the molecular weight of the feed stock. Thus, in general, for the purpose of obtaining increased effectiveness and particularly increased available catalytic surface, it is desirable to conduct the precipitation of the inorganic gel in the presence of an organic material whose molecular or particle weights range from $10^2$ to $10^4$ times the molecular weight of the charge stock to be processed.

The amounts of organic materials or additive employed within the range of 3–30% by weight based upon anhydrous oxide content will preferably vary with the individual organic additive and the particular type of conversion process in which the catalyst is employed. When using gel-forming organic materials, the concentration of additive should be kept below the gel-forming concentrations at the precipitation temperature. Quantities less than 3% by weight do not result in significant changes in gel structure, while quantities above 30% by weight frequently yield overly porous gels which are mechanically unstable and difficult to utilize in commercial processes. In its over-all application, amounts ranging from 10–20% by weight are generally preferred. Within this range the mechanical strength of the granular or beaded organic additive gel catalysts are substantially superior to the non-additive control gels. Also, with the compression-pelleted type catalysts, those produced from the additive gels show a lower bulk density, yet materially higher pellet strength than the non-additive control catalysts. Such increases in mechanical stability and strength serve as further evidence of the modified surface structure of the gels, and are of considerable value in commercial processes where catalyst abrasion and attrition impose limitations on the process. In the preparation of gel-type cracking catalysts, a considerable difference in appearance and properties is evident when utilizing the subject organic additives. Thus, the non-additive control gels are transparent and show a marked tendency to shatter on impact, whereas the additive gels are opaque granules with an increased resistance to impact fracture.

As illustrative of the effect of type of conversion process and charge stock upon optimum molecular weight range and amount of organic material, the comparison between the catalytic reforming of petroleum naphthas and the catalytic cracking of gas oils is presented. Thus, in the catalytic reforming of petroleum naphthas with ground and pelleted catalyst, it is preferred to effect the preparation of the catalyst in the presence of 5–15% by weight of protein additives such as gelatins and glues having molecular weights ranging from 10,000 to 100,000; while in the catalytic cracking of gas oil with beaded or large granular catalysts, higher percentages and higher molecular weights of additives were found to give optimum effectiveness, as, for example, 10–25% by weight of additives having molecular or particle weights materially above 100,000, such as cellulose derivatives, rubber latex, dried skim milk, etc.

In order to obtain a more detailed perspective of the improved catalysts and catalyst bases prepared in accordance with the process of the invention, numerous preparations were made and tested to determine the effect of molecular weight and amount of organic additive upon catalyst improvement in representative conversion processes and varying catalyst compositions. The subsequent general methods of catalyst preparation are presented as representative of the methods used. It is to be understood that certain modifications of these methods were necessary in the preparation of other metal base catalysts.

The following represents the preparation of a granular coprecipitated silica-alumina catalyst gelled in the presence of 20 per cent of natural rubber latex solids which may be used as a cracking catalyst.

1035 grams of Grade N sodium silicate (equivalent to 300 grams silica) was diluted to three liters and adjusted to a pH of 10 by adding dilute sulfuric acid. 200 cc. of natural rubber latex (equivalent to 66 grams of rubber solids) was diluted to one liter and added with stirring, followed by rapid addition of one liter of dilute aluminum chloride solution containing the equivalent of 33.3 grams of alumina. The solution thickened and set to a stiff inorganic gel in 10–20 seconds. At the time of gelation the concentration of rubber solids was 1.1 weight per cent, an amount insufficient to result in coagulation or organic gel formation. The $SiO_2$–$Al_2O_3$ concentration was 5.5 weight per cent, which is sufficient for formation of a semi-solid inorganic oxide gel structure. The gel was repulped with 3 liters of additional water to give a thick slurry, adjusted to a pH of 7 by adding ammonium hydroxide, and filtered. The filter cake was repulped with water to six liters volume and filtered five times, keeping the pH of the thick slurry between 5 and 6 by adding HCl or $NH_4OH$ when necessary. The final filter cake was placed in a drying oven at 210° F. until the gel dried to hard, glass-like granules. These granules were then calcined in air at 1100° F. to burn out the organic additive.

In addition, the following illustrates the preparation of a coprecipitated molybdena-alumina catalyst precipitated in the presence of 10 weight per cent of dissolved animal glue, which was pelleted for use in a dehydrogenation or reforming process.

70 grams of brown flake animal glue having a molecular weight of approximately 60,000 was dissolved by heating in one liter of water and added to 8 liters of dilute aluminum chloride solution containing the equivalent of 600 grams of anhydrous alumina. 90 grams of $MoO_3$ dissolved in one liter of dilute ammonium hydroxide was then added with stirring, followed with 2 liters of concentrated $NH_4OH$ diluted with 2 liters of water. Complete coprecipitation of the $MoO_3$–$Al_2O_3$ resulted. The thick slurry was repulped, adjusted to a pH of 7 and filtered. At the time of coprecipitation the glue concentration was 0.5 weight per cent, an amount insufficient to result in coagulation or organic gel formation, and the $MoO_3$–$Al_2O_3$ concentration was 5 per cent. The filter cake was partially dried then repulped to 14 liters with water and filtered three times for removal of most of the ammonium chloride. The filter cake was then placed in a drying oven at 210° F. for 48 hours to permit setting of the gel structure. The dried cake was then ground and pelleted by compression into 3/16-inch pills, using 4 per cent of graphite lubricant. The pelleted catalyst was then calcined by heating slowly in air to 1180° F. and then held at this temperature for four hours to insure complete oxidation and removal of the organic additive. The final catalyst analyzed 11.6 weight per cent of $MoO_3$, some being lost to solution during washing.

Implementing the coprecipitated plural oxide gels, other preparations were carried out in which an active catalyst component was incorporated by impregnation of the calcined oxide base of the invention as, for example, the impregnation of an improved alumina base with ammonium molybdate, chromate, and chloroplatinic acid. Furthermore, the process of the invention was also applied in the preparation of beaded or spherical catalyst compositions.

Organic materials of varying molecular or particle weights were used in these specific preparations. The effective additives within the molecular weight range of about $1 \times 10^3$ to $1 \times 10^7$ included the starches of varying degrees of hydrolysis, animal proteins, glues, gelatins, pectin, water-soluble derivations of propylene polymers, dried skim milk, rubber latex, methyl cellulose, and dispersed natural cellulose. These additives were employed in varying concentrations within the range of 3–30% by weight based upon the anhydrous oxide content of the catalyst base.

As an illustration of the effectiveness of the present method of preparing inorganic oxide catalysts and catalyst bases, a number of representative data are presented showing some of the aforementioned catalytic improvements as applied to the conventional conversion process. In the evaluation of cracking catalysts prepared according to this invention, a series of granular silica-alumina cracking catalysts prepared in the presence of varying concentrations of organic additives were subjected to a standard Cat. A cracking activity test in comparison with non-additive control catalysts. This test was conducted at 800° F. on a light East Texas gas oil with a 200 cc. catalyst charge and a 10-minute on-stream time. Representative results are as follows:

*Table I*

| Organic Additive | None | Rubber Latex | Dried Skim Milk | Rubber Latex |
|---|---|---|---|---|
| Weight Percent | ---- | 20 | 15 | 15 |
| Approx. Mol. Wt. | ---- | 250,000 | 200,000 | 250,000 |
| Bulk Density | 0.90 | 0.59 | 0.55 | 0.44 |
| Surface Area—M.²/gr | 216 | 315 | 353 | 324 |
| Cat. A Test: | Run (1) / Run (2) | Run (1) / Run (2) | | |
| Space rate, v./v./hr | 1.5 / 3.0 | 1.5 / 3.0 | 1.5 | 1.5 |
| Yields: | | | | |
| Carbon, wt. percent | 4.75 / 3.00 | 4.88 / 2.41 | 4.02 | 3.56 |
| Gas, wt. percent | 10.75 / 5.72 | 11.47 / 6.83 | 10.10 | 9.50 |
| Gasoline, wt. percent | 40.6 / 32.7 | 46.1 / 36.7 | 42.3 | 43.7 |
| Gasoline/Coke ratio | 8.6 / 10.9 | 9.5 / 15.2 | 10.5 | 12.3 |

Additional results obtained using 15% by weight of an animal glue of a molecular weight of about 50,000 and 15% by weight of a gelatin whose molecular weight was about 75,000 showed an increase in catalytic activity over the control but not as great an improvement in gasoline-to-coke ratio as was obtained using the higher molecular weight additives. An improvement in catalytic activity was also obtained with even lower molecular weight additives such as 10% of a partially hydrolyzed starch with a molecular weight of about 15,000.

An accentuation of the improvements in catalyst composition is borne out in a comparison of the carbon-burning rates during regeneration which is presently a limitation in the design and operation of many catalytic conversion processes and is emphasized in catalytic cracking. The following tabular data indicates the higher burning rates obtained when employing the additive catalysts and particularly the preferred higher molecular weight additives in the preparation of coprecipitated $SiO_2$–$Al_2O_3$ cracking catalysts.

*Regeneration after Cat. A Testing*
[Excess air at 980° F.]

| Organic Additive | None | Rubber Latex | Animal Glue | None | Rubber Latex |
|---|---|---|---|---|---|
| Weight percent | ---- | 20 | 20 | ---- | 20 |
| Approx. mol. wt | ---- | 250,000 | 50,000 | ---- | 250,000 |
| Percent Carbon removed during regeneration: After— | | | | | |
| 30 min | 32.6 | 39.6 | 36.1 | 32.5 | 46.7 |
| 50 min | 55.8 | 78.4 | 70.2 | 53.4 | 82.2 |
| 70 min | 69.0 | 94.1 | 87.4 | 70.9 | 96.9 |

The increased carbon burning rates as demonstrated with the organic additive type catalyst is a particular advantage in the conventional catalytic cracking processes. With this type of catalysts, existing plants could operate on greater coke producing feeds or utilize higher catalyst circulation rates and higher conversion levels on present feeds without exceeding their capacity for adequate regeneration of coked catalyst.

As a further illustration of the practical application of these improved catalyst compositions, additional data are presented on hydroforming operations which involve catalytic reforming and dehydrogenation. The test upon which the following comparative results were obtained was conducted on a heavy Mid-Continent naphtha stock having an F-1 octane number of 57.0, at 200 p. s. i. g., a 1.0 v./v./hr. space rate with 6,000 cu. ft./bbl. of process gas recycle and 1-hour on-stream period. Activity testing was done at two temperatures to give comparable data on the catalysts over a range of conversion levels. The particular series of catalyst compositions tested were pelleted molybdena-alumina catalysts prepared in the presence of varying molecular weights and amounts of organic additives and with molybdena concentrations varied in an effort to obtain approximately uniform activity on constant octane number product at these test conditions.

*Table II*
[Inlet temperature, 925° F.]

| Organic additive | None | Gelatin | Glue | Potato Starch | Animal Protein | Pectin |
|---|---|---|---|---|---|---|
| Weight percent | ---- | 10 | 10 | 10 | 10 | 10 |
| Approx. Mol. Wt. | ---- | 80,000 | 60,000 | 10,000 | 25,000 | 40,000 |
| $MoO_3$, Weight percent | 12.0 copptd. | 10.1 copptd. | 11.6 copptd. | 8.5 copptd. | 10.2 copptd. | 11.6 copptd. |
| Octane Number of Prod. ($C_5$ free) F-1 clear | 89.8 | 91.0 | 89.9 | 88.8 | 88.2 | 88.5 |
| Carbon produced, grams | 6.92 | 3.34 | 4.41 | 3.03 | 3.38 | 3.47 |
| Product yields: | | | | | | |
| Carbon, wt. percent | 1.7 | 0.8 | 1.1 | 0.8 | 0.9 | 0.9 |
| Gas, wt. percent | 11.0 | 9.1 | 7.7 | 7.1 | 9.6 | 7.1 |
| Liquid, wt. percent | 87.3 | 90.1 | 91.2 | 92.1 | 89.5 | 92.0 |

Table III

[Inlet Temperature, 955° F.]

| Organic Additive | None | Gelatin | Gelatin | Glue |
|---|---|---|---|---|
| Weight percent | | 5 | 14 | 15 |
| Approx. mol. wt | | 80,000 | 80,000 | 60,000 |
| MoO$_3$, weight percent | 12.0 copptd. | 11.5 copptd. | 10.6 impreg. | 10.5 copptd. |
| Octane Number of Product (C$_4$ free) F-1 clear | 94.5 | 94.2 | 95.8 | 95.2 |
| Carbon produced, grams | 11.58 | 8.6 | 5.60 | 4.61 |
| Product yields: | | | | |
| Carbon, wt. percent | 2.9 | 2.2 | 1.4 | 1.2 |
| Gas, wt. percent | 12.1 | 11.1 | 12.2 | 12.0 |
| Liquid, wt. percent | 85.0 | 86.7 | 86.4 | 86.8 |

As will be noted from the foregoing data, the catalysts prepared in the presence of the organic additives all indicate a considerable improvement in liquid product yields with a marked reduction in the amount of coke produced. Additional data have indicated that the higher molecular weight additives, such as those appreciably above 100,000, although resulting in a high activity catalyst, do not effect the same degree of coke reduction as the lower molecular weight additives.

Obviously, many modifications and variations of the invention as hereinabove set forth may be made without departing from the spirit and scope thereof, and only such limitations should be imposed as are indicated in the appended claims.

I claim:

1. A process for producing improved gel-type oxide catalysts suitable for use in high temperature catalytic hydrocarbon conversion processes which comprises mixing an aqueous solution of an inorganic compound capable of yielding a hydrous oxide gel when precipitated, and an aqueous dispersion of a water-dispersible organic material having a molecular weight within the range of $1 \times 10^3$ to $1 \times 10^7$, said organic material being present in an amount within the range of 3% to 30% by weight based upon the content of said inorganic compound in said mixture calculated as anhydrous oxide, said organic material being present in insufficient concentration to form an organic gel, adding a precipitant to said mixture to precipitate said hydrous oxide gel containing water soluble salts formed during the precipitation, washing said hydrous oxide gel to remove said water soluble salts, the hydrous oxide gel forming the external phase and the organic material being present as an internally dispersed, non-gel phase, then subjecting the washed hydrous oxide gel to an initial drying step consisting of heating at a temperature of at least about 150° F. but below a temperature at which substantial decomposition of the organic material occurs, sufficient to establish the lattice structure of the inorganic oxide and to prevent formation of an organic gel structure while the inorganic oxide lattice structure is being established, and then calcining the dehydrated oxide gel to decompose and remove the organic material, thereby to produce a stable, highly porous, high surface area catalyst.

2. A process for producing improved plural gel-type oxide catalysts suitable for use in high temperature catalytic hydrocarbon conversion processes which comprises mixing an aqueous solution of at least two inorganic compounds capable of yielding hydrous oxides when precipitated, and an aqueous dispersion of a water-dispersible organic material having a molecular weight within the range of $1 \times 10^3$ to $1 \times 10^7$, said organic material being present in an amount within the range of 3% to 30% by weight based upon the content of said inorganic compounds in said mixture calculated as anhydrous oxides, but in insufficient concentration to form an organic gel, precipitating a plural hydrous oxide gel containing water soluble salts formed during the precipitation, washing said hydrous oxide gel to remove said water soluble salts, the hydrous oxide gel forming the external phase and the organic material being present as an internally dispersed, non-gel phase, then subjecting the washed hydrous oxide gel to an initial drying step consisting of heating at a temperature of at least about 150° F. but below a temperature at which substantial decomposition of the organic material occurs, sufficient to establish the lattice structure of the inorganic oxide and to prevent formation of an organic gel structure while the inorganic oxide lattice structure is being established, and then calcining the dehydrated oxide gel to decompose and remove the organic material, thereby to produce a stable, highly porous, high surface area plural oxide catalyst.

3. A process which comprises catalytically reforming petroleum naphtha to produce gasoline which comprises contacting said naphtha at reforming conditions with the catalyst of claim 1.

4. The process as described in claim 1 wherein the metal oxide catalyst comprises aluminum and molybdenum oxides.

5. The process as described in claim 1 wherein the metal oxide catalyst comprises aluminum oxide.

6. The process as described in claim 1 wherein the metal oxide catalyst comprises silicon and aluminum oxides.

7. The process as described in claim 1 wherein the organic material is animal glue.

8. The process as described in claim 1 wherein the oxide catalyst comprises aluminum and molybdenum oxides, and wherein the organic material has a molecular weight in the range of about 10,000 to about 100,000.

9. The process as described in claim 1 wherein the metal oxide catalyst comprises aluminum and molybdenum oxides and wherein the organic material is animal glue.

10. A hydrocarbon reforming catalyst made in accordance with the process of claim 1.

11. A hydrocarbon reforming catalyst made in accordance with the process of claim 8.

12. A hydrocarbon reforming catalyst made in accordance with the process of claim 9.

13. The process as described in claim 3 wherein the oxide catalyst comprises aluminum and molybdenum oxides.

14. The process as described in claim 3 wherein the oxide catalyst comprises aluminum and molybdenum oxides, and wherein the organic material has a molecular weight in the range of about 10,000 to about 100,000.

15. The process as described in claim 14 further characterized in that the organic material is animal glue.

16. A process of catalytically cracking a hydrocarbon oil which comprises subjecting said oil to cracking conditions in the presence of an improved gel type metal oxide catalyst made by precipitating a hydrous metal oxide in the presence of an aqueous dispersion of a water-dispersible organic material to produce a hydrous metal oxide external gel phase containing said organic material having a molecular weight within about the range $1 \times 10^3$ to $1 \times 10^7$ distributed therein as an internal dispersed phase, said organic material being present in an amount within about the range of 3 to 30 per cent by weight, based on anhydrous oxide, but in an insufficient concentration to form an organic gel, washing said hydrous metal oxide gel to remove inorganic water-soluble salt material formed during precipitation, and then heating the washed oxide gel containing dispersed organic material to a temperature of at least about 150° F. sufficient to establish the lattice structure of the inorganic oxide and to prevent formation of an organic gel structure and to dehydrate the oxide gel, then calcining the dehydrated oxide gel to decompose and remove the organic material, and to produce a stable, highly porous, high-surface-area catalyst.

17. The process substantially as described in claim 16 wherein the oxide catalyst comprises aluminum and silicon oxides.

18. The process substantially as described in claim 16 wherein the oxide catalyst comprises aluminum and silicon oxides, and wherein the organic material has a molecular weight of at least about 100,000.

19. The process substantially as described in claim 18 further characterized in that the organic material is natural rubber latex solids.

References Cited in the file of this patent

UNITED STATES PATENTS

| Number | Name | Date |
|---|---|---|
| 1,976,875 | Connolly | Oct. 16, 1934 |
| 2,317,803 | Reeves | Apr. 27, 1943 |
| 2,337,628 | Schulze | Dec. 28, 1943 |
| 2,384,945 | Marisic | Sept. 18, 1945 |

(Other references on following page)

UNITED STATES PATENTS

| Number | Name | Date |
|---|---|---|
| 2,410,284 | Gunness | Oct. 29, 1946 |
| 2,428,910 | Foster | Oct. 14, 1947 |
| 2,454,724 | Tamele et al. | Nov. 23, 1948 |
| 2,471,000 | Messenger | May 24, 1949 |
| 2,479,110 | Haensel | Aug. 16, 1949 |
| 2,481,824 | Claussen et al. | Sept. 13, 1949 |
| 2,490,260 | Ehrhardt | Dec. 6, 1949 |
| 2,499,680 | Plank | Mar. 7, 1950 |
| 2,526,907 | Schmerling | Oct. 24, 1950 |